UNITED STATES PATENT OFFICE.

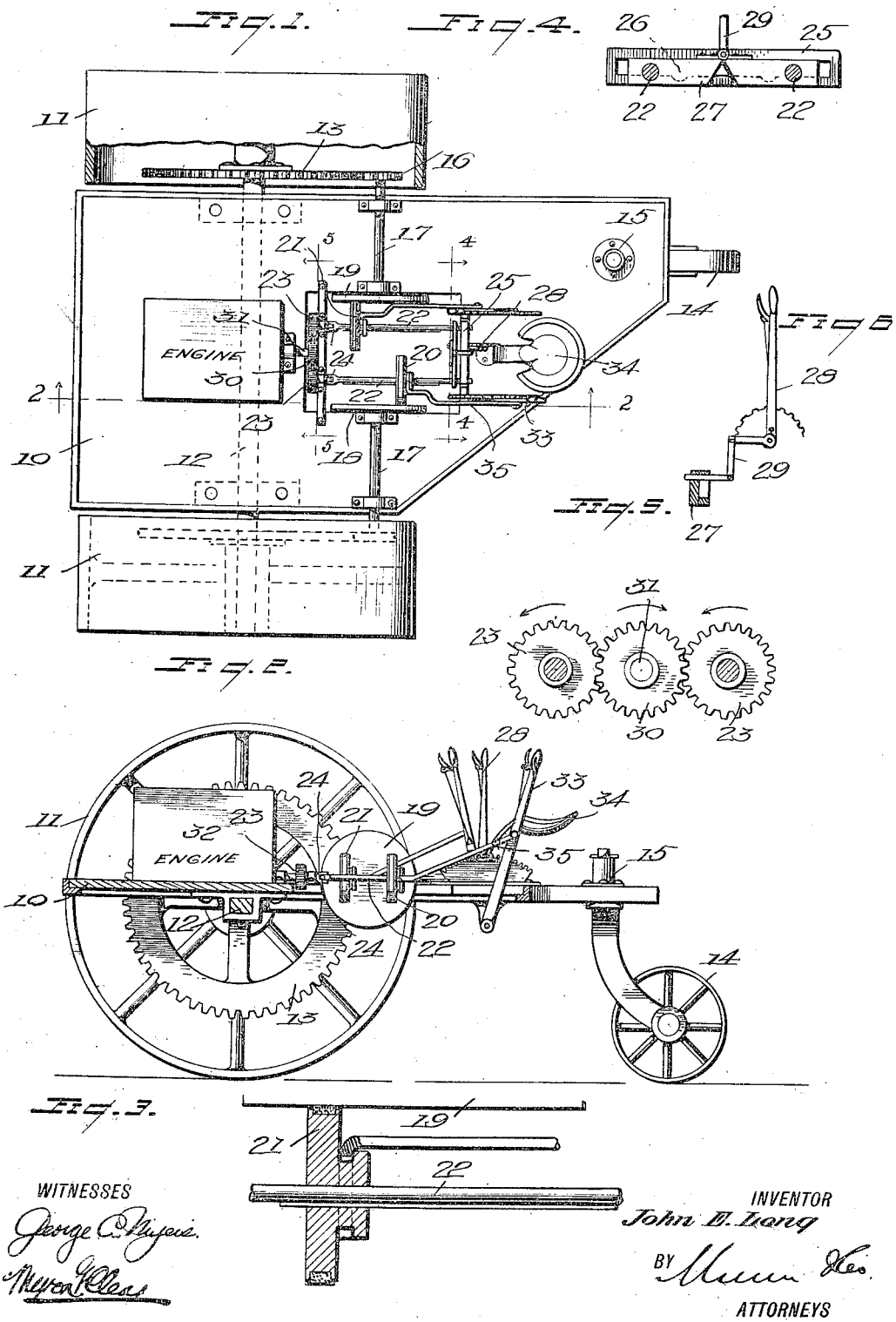

JOHN E. LONG, OF HOT SPRINGS, MONTANA.

TRACTOR.

1,272,475.                    Specification of Letters Patent.       Patented July 16, 1918.

Application filed May 7, 1917. Serial No. 166,877.

*To all whom it may concern:*

Be it known that I, JOHN E. LONG, a citizen of the United States, and a resident of Hot Springs, in the county of Sanders and State of Montana, have invented a certain new and useful Improvement in Tractors, of which the following is a specification.

My present invention relates generally to tractors, and more especially to agricultural tractors, my object being to provide a simple inexpensive type of tractor capable of ready control and having the advantages in construction and operation to be hereinafter set out in detail.

With the above in mind, my invention resides in the features of construction, arrangement, and operation to be now described with respect to the accompanying drawings forming a part of this specification, and wherein—

Figure 1 is a top plan view partly broken away and in section;

Fig. 2 is a vertical longitudinal section taken substantially on line 2—2 of Fig. 1;

Fig. 3 is an enlarged detail section through one of the friction wheels;

Figs. 4 and 5 are detail sections taken respectively on lines 4—4 and 5—5 of Fig. 1, and Fig. 6 is a detail plan view of the hinged control connection between the shafts of the friction wheels.

Referring now to these figures, my improved tractor includes a main frame 10 at the forward side portions of which are arranged traction wheels 11, rotatable upon the ends of a lower transverse axle 12, and each provided with an enlarged internal gear 13, the rear portion of the frame 10 being secured by a caster wheel 14 freely shiftable in its swiveled connection at 15 with the rear portion of the main frame, to follow the steering movements of the latter, as presently described.

The gears 13 of the traction wheels 11 are engaged by gears 16 upon the outer ends of a pair of transversely alined shafts 17, the inner ends of which terminate in spaced relation and are provided with spaced apart friction disks 18 and 19, respectively into engagement with which are friction wheels 20 and 21.

The friction wheels 20 and 21 are normally in engaged relation with the disks by means of shafts 22 upon which they are splined, these shafts having at their forward ends gear wheels 23 and being provided with universal joints 24 adjacent their said gear wheels, permitting their rear ends to be shifted toward and away from one another to respectively move the friction wheels from and toward the friction disks 18 and 19.

The rear ends of the shafts 22 are shiftable in a slotted frame 25 disposed transversely of the main frame 10, and said rear ends of said shafts are journaled through the side portions of a two-part hinged controlling member 26, the hinged connection of the parts of which appears at 27, and is plainly to be seen by reference to Fig. 4, these parts being so arranged that by elevating the central hinged portion of the member 26 through connections from the controlling lever 28, including a link 29, the rear ends of the shafts 22 will be drawn toward one another and the friction wheels 20 and 21 withdrawn from engagement with the disks 18 and 19.

The gears 23 at the forward ends of the shafts 22 are in engagement, at respectively opposite sides, with a gear wheel 30 at the rear end of the engine shaft 31, the latter extending rearwardly from a suitable engine or motor, conventionally illustrated at 32.

It is obvious that the lever 28 controls the operative connections between the engine and the wheels 11, and that, by shifting the friction wheels 20 and 21, the speed and direction of rotation of the traction wheels 11 may be independently controlled.

To this end, a controlling lever 33 is mounted at each side of the driver's seat 34, in front of the latter of which the lever 28 is disposed, each lever 33 having a connecting rod 35 connecting the same with its respective friction wheel 20, 21, so as to shift the latter longitudinally of its supporting shaft 22.

From the foregoing it is apparent that my improvements avoid all necessity for changing the speed or direction of the engine to permit of development of the most power to the driving wheels when the tractor is going slowest, and vice versa, in order that, when the load is heaviest, the tractor will proceed slowly, and when the load is light, the tractor may be made to correspondingly increase its speed by simply shifting the friction wheels 20 and 21 respectively from and toward the center of the disks 18 and 19.

It is further obvious that with my improvements I am enabled to turn the tractor in a standing position by shifting the friction wheels to drive one wheel in one direction and the other wheel in the opposite direction at the same rate of speed, from which it is apparent that the traction wheels 11 operate as combined driving and steering wheels at all times, the connections described permitting of their independent control so as to drive one at a speed greater or less than the speed of the other at any time it is desired to change the direction of the tractor, the caster wheel 14 simply following the movements of the main frame.

It is further obvious that with the engine rotating at the same speed and in the same direction, I am enabled to drive the tractor either forwardly or rearwardly and at a great variety of speeds in either direction, by simply shifting the friction wheels.

I claim:

In a tractor of the character described, the combination of a main frame, a pair of forward side traction wheels, operatively connected to the main frame, a pair of transversely disposed shafts mounted on the main frame and having gear connections with the traction wheels, and provided with inner friction disks opposing one another in spaced relation, a pair of friction wheels engageable with said friction disks, shafts on which the friction wheels are mounted and shiftable for adjustment with respect to the disks, controlling connections for independently shifting the said friction wheels, a source of power on the main frame, geared connections between the said source of power and the said friction wheel shafts, said shafts of said friction wheels having universally movable joints adjacent one another, a guide member in which the opposite ends of said shafts are shiftable, a controlling member through which the last mentioned ends of the shafts are journaled, having a hinged joint intermediate the shafts, and an operating lever connected to the said controlling member for moving the latter to shift the said friction wheel shafts toward and away from one another.

JOHN E. LONG.

Witnesses:
 WALTER T. GUTZ,
 B. A. MORE.